(No Model.)

H. BETTEN.
ROTARY ENGINE.

No. 481,096. Patented Aug. 16, 1892.

WITNESSES:
Chas. Niaa.
C. Sedgwick

INVENTOR:
H. Betten
BY Munn & Co.
ATTORNEYS

UNITED STATES PATENT OFFICE.

HERMANN BETTEN, OF HEGENSDORF, GERMANY.

ROTARY ENGINE.

SPECIFICATION forming part of Letters Patent No. 481,096, dated August 16, 1892.

Application filed April 4, 1892. Serial No. 427,686. (No model.)

*To all whom it may concern:*

Be it known that I, HERMANN BETTEN, a subject of the Emperor of Germany, at present residing in Hegensdorf, Westphalia, Germany, have invented a new and Improved Rotary Engine, of which the following is a full, clear, and exact description.

The object of the invention is to provide a new and improved rotary engine which is simple and durable in construction, very effective in operation, and arranged to utilize the motive agent to the fullest advantage.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1:
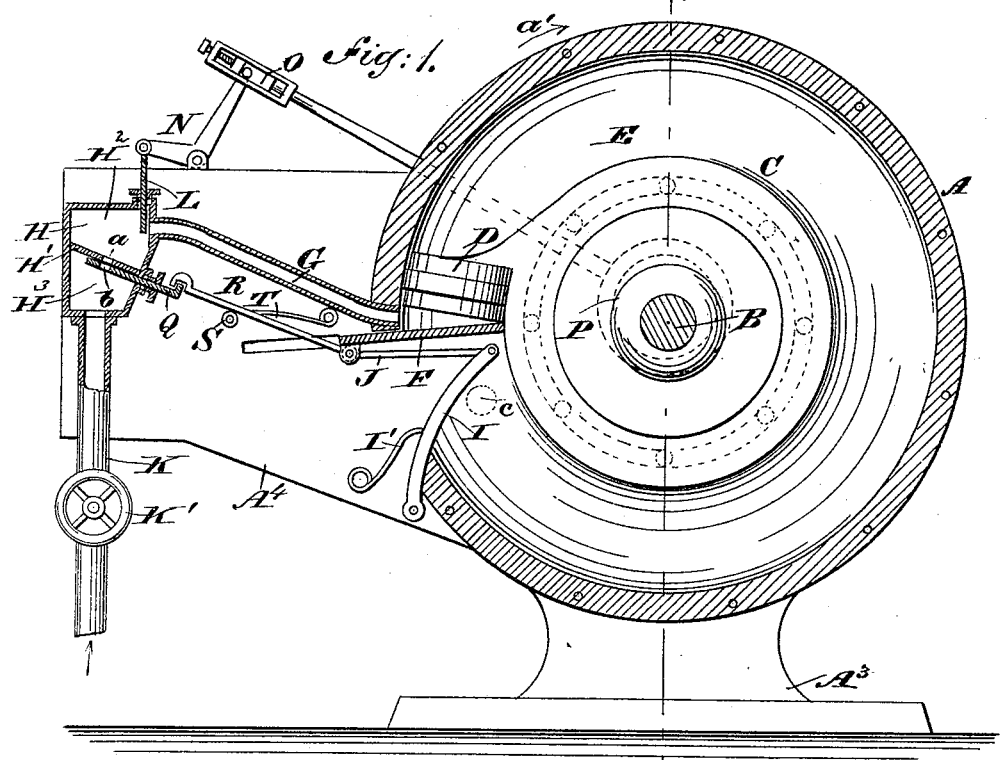
Figure 2:
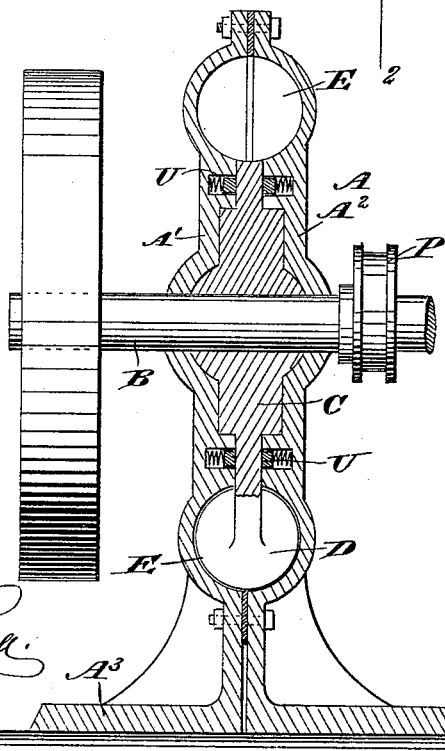

Figure 1 is a sectional side elevation of the improvement, and Fig. 2 is a transverse section of the same on the line 2 2 of Fig. 1.

The improved rotary engine is provided with a cylinder A, preferably made of the two parts A' and A², bolted or otherwise fastened together and forming a base A³. In the cylinder A is mounted to turn in suitable bearings the main shaft B, provided with a suitable fly-wheel or pulley for transmitting the rotary motion of the engine to other machinery. On the shaft B is secured a piston C, arranged within the cylinder A and provided with a circular head D, traveling in a circular space E, formed in cross-section of the shape of the head D.

In the cylinder A is fitted to slide a gate F, adapted to pass into or out of the space E, the said gate F being arranged radially relative to the shaft B and cylinder A and serving to close the space E below the head D to permit the motive agent to act on the said head to rotate the piston C in the direction of the arrow $a'$.

Directly above the gate F is arranged an inlet-pipe G, discharging the motive agent into the space E at the time the head D travels from the said gate F in the direction above indicated. The gate F is actuated directly from the head D, and for this purpose the under side of the gate is pivotally connected by a link J with an arm I, pivoted on the cylinder A, as is plainly shown in Fig. 1. The arm I projects into the steam-space E below the gate F, so that when the piston C rotates, as above described, the head D strikes the said arm and swings the same outward, so that the gate F is caused to slide outward by the pressure exerted on the said gate by the link J. A spring I' presses on the arm I to hold the latter in an innermost position to keep the gate F closed during the time the head D is past the said arm I and past the gate F. Thus when the head D has left the gate F and the inlet-pipe G the spring I' quickly shuts the said gate to permit the motive agent entering from the pipe G to press on the head D and force the same in the direction above indicated.

The pipe G is connected with a steam-chest H, formed with a transverse partition H', dividing the steam-chest into two compartments H² and H³, of which the compartment H² is connected with the said pipe G, and the other compartment H³ is connected with an inlet-pipe K, having a valve K', and connected with a suitable source of supply of the motive agent.

In the compartment H² and over the entrance of the pipe G is fitted to slide a valve L for controlling the amount of motive agent passing to the pipe G. The valve L extends to the outside of the steam-chest H and is pivotally connected with one arm of a bell-crank lever N, the other arm of the said lever being adjustably connected with the eccentric-rod O of an eccentric P, held on the main driving-shaft B outside of the cylinder A, as is plainly shown in Fig. 1.

In the partition H' of the steam-chest H is arranged a port $a$, adapted to register with a port $b$, formed in a valve Q, fitted to slide on the under side of the said partition H' and connected at its outer end with a link R, pivotally connected with the gate F. The link R is guided on a friction-roller S, supported from a projection or bracket A⁴, held on the cylinder A, said bracket also carrying the steam-chest H. A spring T presses on the top of the link R and holds the same in contact with the friction-roller S.

The operation is as follows: When the several parts are in the position shown in Fig. 1, the motive agent passing through the supply-pipe K, enters the compartment H³ of the steam-chest H and passes from the said compartment through the two registering ports $b$ and $a$ into the compartment H² and from the latter into the pipe G, the valve L being withdrawn, as shown. The motive agent passes from the pipe G into the steam-space E between the closed gate F and the head D, so that the force exerted by the motive agent on the head D forces the piston C in the direction of the arrow $a'$. The shaft B is thus rotated and motion is transmitted to the machinery to be driven. The rotary motion of the shaft B causes the eccentric P to actuate the bell-crank lever N, so that the valve L cuts off the steam entering the pipe G at the proper time, the cut-off being regulated by adjusting the connection of the bell-crank lever N with the eccentric-rod O. When the piston C has nearly made a complete revolution, it strikes against the pivoted arm I, forcing the same outward, so as to withdraw the gate F to permit the head D to pass the said arm and the said gate. When the head D has passed the outlet-port $c$, formed in the cylinder A below the gate F, the motive agent in the rear of the head can escape, it being understood that at this time the motive agent is shut off by the valve L. The outward movement of the gate F causes a closing of the valve Q, so that the motive agent is shut off from the compartment H², and thus it is not possible for any steam to enter the steam-space E during the time the head D passes the arm I and the withdrawn gate F. As soon as the head D has passed the gate F the spring I' closes the said gate, as previously described, and the valve Q is opened to permit the motive agent to pass from the compartment H³ to the compartment H² and from the latter to the pipe G and steam-space E, as above described. As shown in Fig. 2, suitable spring-pressed packing-rings U are arranged in the cylinder parts A' and A² to make the piston C steam-tight in the said cylinder.

Having thus described my invention, I claim as new and desire to secure by Letters Patent—

1. In a rotary engine, the combination, with a cylinder having an annular steam-space and a piston mounted to turn in the cylinder and provided with a head traveling in the steam-space of the cylinder, of a gate fitted to slide in and out of the steam-space of the cylinder and actuated by the piston, a steam-chest provided with an apertured partition, a valve for opening and closing the aperture of the partition and operated by the sliding gate, an inlet leading from the steam-chest to the steam-space of the cylinder above the gate, and a valve for opening and closing said inlet and operated from the shaft of the piston, substantially as described.

2. In a rotary engine, the combination, with a cylinder having an annular steam-space, of a piston mounted to turn in the said cylinder and having a head fitting the said steam-space, a gate fitted to slide in the said cylinder to and from the said steam-space, and a spring-pressed arm pivotally connected with the said gate and projecting into the said steam-space to be actuated by the head of the said piston, substantially as shown and described.

3. In a rotary engine, the combination, with a cylinder having an annular steam-space, of a piston mounted to turn in the said cylinder and having a head fitting the said steam-space, a gate fitted to slide in the said cylinder to and from the said steam-space, a spring-pressed arm pivotally connected with the said gate and projecting into the said steam-space to be actuated by the head of the said piston, a steam-chest provided with a partition having a port, said steam-chest being connected with the said steam-space of the cylinder, and a valve controlling the connection between the said steam-chest and steam-space of the cylinder, substantially as shown and described.

4. In a rotary engine, the combination, with a cylinder having an annular steam-space, of a piston mounted to turn in the said cylinder and having a head fitting the said steam-space, a gate fitted to slide in the said cylinder to and from the said steam-space, a spring-pressed arm pivotally connected with the said gate and projecting into the said steam-space to be actuated by the head of the said piston, a steam-chest provided with a partition having a port, said steam-chest being connected with the said steam-space of the cylinder, a valve controlling the connection between the said steam-chest and steam-space of the cylinder, and a second valve adapted to open and close the apertured partition of the steam-chest and actuated from the said gate, substantially as shown and described.

5. In a rotary engine, the combination, with a cylinder having an annular steam-space, a piston-head in said steam-space, and a gate fitted to slide in and out of the steam-space and operated by the piston, of a steam-chest provided with an apertured partition dividing the steam-chest into two compartments, one of which is connected with the steam-space of the cylinder and the other with the steam-supply, a valve for opening and closing the aperture of the partition, and a connection between the valve and gate, substantially as described.

HERMANN BETTEN.

Witnesses:
JOHANNES PUMTE,
*Baugewerksmeister.*
KARL HAEMMERLING,
*Techniker.*